(12) United States Patent
Daniel et al.

(10) Patent No.: US 10,520,031 B2
(45) Date of Patent: Dec. 31, 2019

(54) LINEAR ROLLER BEARING HAVING AN ATTACHMENT ELEMENT FOR LONG-TERM LUBRICATION

(71) Applicant: Schaeffler Technologies AG & Co. KG, Herzogenaurach (DE)

(72) Inventors: Patrick Daniel, Kirkel (DE); Ralf Stalter, Zweibrucken (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/767,864

(22) PCT Filed: Oct. 26, 2016

(86) PCT No.: PCT/DE2016/200492
§ 371 (c)(1),
(2) Date: Apr. 12, 2018

(87) PCT Pub. No.: WO2017/076408
PCT Pub. Date: May 11, 2017

(65) Prior Publication Data
US 2018/0306244 A1    Oct. 25, 2018

(30) Foreign Application Priority Data

Nov. 2, 2015  (DE) .......................... 10 2015 014 058
Feb. 18, 2016  (DE) .......................... 10 2016 202 502

(51) Int. Cl.
*F16C 33/66*     (2006.01)
*F16C 29/06*     (2006.01)
(Continued)

(52) U.S. Cl.
CPC ........ *F16C 33/6659* (2013.01); *F16C 29/065* (2013.01); *F16C 29/0619* (2013.01);
(Continued)

(58) Field of Classification Search
CPC .................. F16C 33/66–6696; F16C 33/1045
See application file for complete search history.

(56) References Cited

U.S. PATENT DOCUMENTS 5,399,023 A    3/1995  Winkelmann et al.
6,125,968 A *  10/2000  Shirai .................... F16C 29/008
                                                                184/100
(Continued)

FOREIGN PATENT DOCUMENTS

CN           1644939 A     7/2005
CN         102434585 A     5/2012
(Continued)

*Primary Examiner* — Alan B Waits
(74) *Attorney, Agent, or Firm* — Volpe and Koenig, P.C.

(57) ABSTRACT

A linear roller bearing having a rolling body circulating shoe (15) including end-arranged attachment elements (16) as a lubricating device, wherein each attachment element contains a volume (9) for storing lubricant and transferring lubricant to a rail that guides the circulating shoe. According to the invention, the attachment element is formed from an inner housing shell (8b), which lies against the head piece (4) of the support body (1) of the circulating shoe, and an outer housing shell (8a), which faces away from the support body, which housing shells can be fastened to the head piece of the support body by a central screw (17).

16 Claims, 6 Drawing Sheets

(51) Int. Cl.
*F16C 33/10* (2006.01)
*F16C 29/08* (2006.01)

(52) U.S. Cl.
CPC ........ *F16C 29/086* (2013.01); *F16C 33/1045* (2013.01); *F16C 33/664* (2013.01); *F16C 2226/60* (2013.01)

(56) References Cited

U.S. PATENT DOCUMENTS

| | | | | |
|---|---|---|---|---|
| 2004/0234176 | A1* | 11/2004 | Sattler | F16C 29/065 384/13 |
| 2005/0178619 | A1* | 8/2005 | Chi-Meng | F16C 29/0642 184/5 |
| 2008/0080795 | A1 | 4/2008 | Kuwabara et al. | |
| 2010/0002965 | A1* | 1/2010 | Kondo | F16C 29/0609 384/13 |
| 2012/0073396 | A1* | 3/2012 | Kawaguchi | F16C 29/0652 74/424.82 |
| 2012/0195535 | A1* | 8/2012 | Shibuya | F16C 29/065 384/13 |
| 2013/0195386 | A1* | 8/2013 | Matsumoto | F16C 29/086 384/13 |
| 2013/0216160 | A1 | 8/2013 | Ooga | |
| 2015/0010253 | A1* | 1/2015 | Shibuya | F16C 33/7823 384/15 |
| 2015/0071576 | A1* | 3/2015 | Kito | F16C 33/6648 384/13 |
| 2015/0345561 | A1* | 12/2015 | Elting | F16C 33/76 384/15 |
| 2017/0097041 | A1* | 4/2017 | Chen | F16C 33/6659 |

FOREIGN PATENT DOCUMENTS

| | | |
|---|---|---|
| CN | 103148101 A | 6/2013 |
| DE | 4141038 | 6/1993 |
| DE | 4438566 | 5/1996 |
| DE | 19845181 | 4/2000 |
| DE | 202004017105 | 2/2005 |
| DE | 102009016458 | 10/2010 |
| DE | 102009016459 | 10/2010 |
| EP | 2913545 | 9/2015 |
| JP | 2001323930 A | 11/2001 |
| JP | 2002048137 | 2/2002 |

* cited by examiner

Prior art

Fig. 1

Prior art

LINEAR ROLLER BEARING HAVING AN ATTACHMENT ELEMENT FOR LONG-TERM LUBRICATION

FIELD OF THE INVENTION

The invention relates to a linear roller bearing with a roller body circulating shoe that has attachment elements arranged on the end as lubricating devices, wherein each attachment element contains a volume for lubricant storage and lubricant transfer to a rail guiding the circulating shoe.

BACKGROUND OF THE INVENTION

The use of such an attachment element is known in the field of lubricant storage in technology using rolling bearings in or on bearings, in general. In particular, this invention relates to an attachment element for single-row, linear circulating shoes.

In the prior art, chambers with lubricants are mounted on roller bearings. As one example, a first construction of a long-term lubricating unit in a linear range is named, which is described in the publications DE 10 2009 016 458 A1 and DE 10 2009 016 459 A1. This uses a storage body that is made from an absorbent material and can be saturated with a flowable lubricant. Such storage bodies are constructed in the form of hollow cavities in the respective lubricating device.

A second construction of such a lubricating device is known from the publication DE 198 45 181 A1. In this device, in each housing that contains the lubricant there is a dispenser that is in sliding contact with the relevant raceways of the guide rail. Each lubricant dispenser is pressed via a spring onto the raceways of the guide rail and are connected by a supply channel to a lubricant container. In the supply channel and in the lubricant container there is a storage body made from a capillary material. This storage body must be saturated with the lubricant media in a complicated manner.

In another construction of a lubricating device that is known from the publication DE 20 2004 017 105 U1, multiple disk-shaped fiber elements are arranged in the interior of a housing forming the lubricant container and in which there is at least one flange element passing through openings in the interior walls of the housing and in sliding contact with the raceways of the guide rail. The fiber elements fulfill the function of a storage body and in at least one case also the function of the lubricant dispenser.

SUMMARY OF THE INVENTION

The invention is based on the objective of providing an attachment element with a simple design that can be easily installed for the circulating shoe of the linear roller bearing.

This object is achieved according to the invention in that the attachment element is made from an inner housing shell contacting the head piece of the support body of the circulating shoe and an outer housing shell that is facing away from the support body and can be mounted by a central screw on the head piece of the support body.

Thus, the attachment element can be mounted on an existing circulating shoe at a later time.

The lubricant transfer position of the attachment element can be pretensioned and can compensate for wear.

Due to its shape, the attachment element can be centered locked in rotation on the head piece. It can also be centered and mounted locked in rotation on a structurally identical attachment element.

The storage volume can be provided by at least two housing shell structures that are sealed relative to each other by the pretensioning force of at least one fastening screw. In this way, there can be no undesired leakage of the lubricant to the surroundings. It is recommended for one of the shells to have a rubber elastic form.

The attachment element can be formed so that at least one shell forming the housing can hold a strip, in order to form a seal against the running surface. In this way, the strip can be arranged integrally on another housing shell. It is recommended for these shells to have a rubber elastic construction to form a seal.

BRIEF DESCRIPTION OF THE DRAWINGS

Embodiments of the invention are shown in the drawing and will be described in more detail below. Shown are.

DETAILED DESCRIPTION

Figure 1:
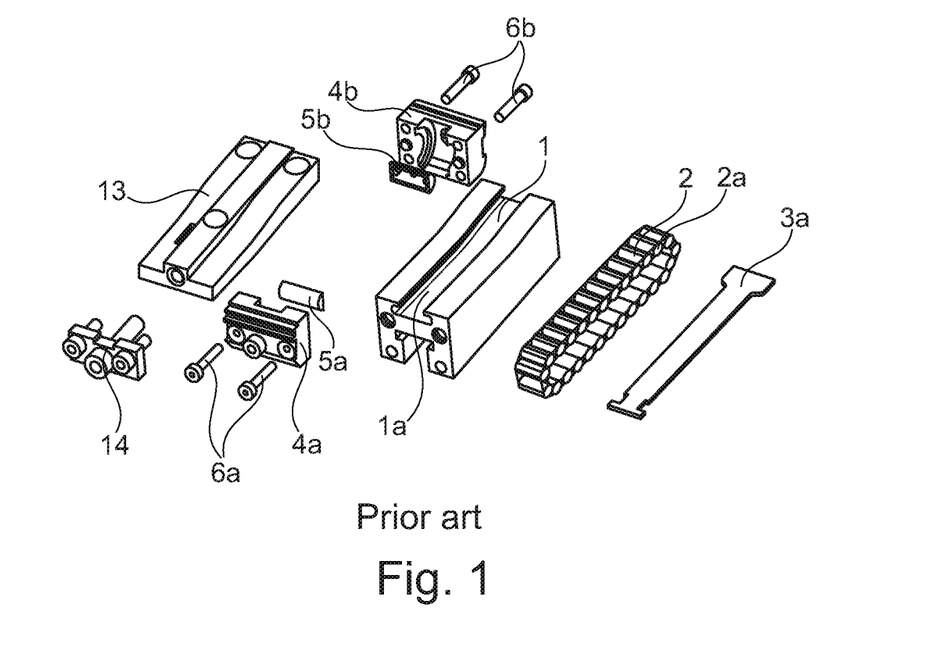
FIG. 1 the parts of an exemplary roller circulating shoe in an exploded view type representation, FIG. 2 the roller circulating shoe that is built with the parts shown in FIG. 1 in a perspective view, FIG. 3 a previously known lubricant storage described in publication DE 10 2009 016 458 A1 in a roller circulating shoe, in an exploded view type representation, FIG. 4 another previously known end-side view of a guide rail disclosed in publication DE 198 45 181 A1 for a linear bearing with an open lubricating device partially surrounding this bearing, in a section view, FIG. 5 a perspective view of a roller circulating shoe and also parts of its attachment elements, in an exploded view type representation, FIG. 6 the roller circulating shoe with the attachment elements according to FIG. 5, in a perspective view, FIG. 7 a structure according to the invention of a lubricant storage arranged on the end on the roller circulating shoe, in cross section, FIG. 8 the circulating shoe with the attachment element that is arranged on an end side and has, according to the invention, a spring mounting of the lubricant transfer element, in 3D cross section, FIG. 9 the circulating shoe with the attachment element that is arranged on an end side and has, according to the invention, a centering device with rotational locking of its housing shells, in 3D cross section, FIG. 10 the circulating shoe with the attachment element according to FIG. 9, in cross section, FIG. 11 the circulating shoe with a centering device according to the invention with rotational locking of two attachment elements attached one behind the other on one side, in cross section, and FIG. 12 an attachment element for a roller circulating shoe with integrated strip, in a perspective view.
Figure 2:
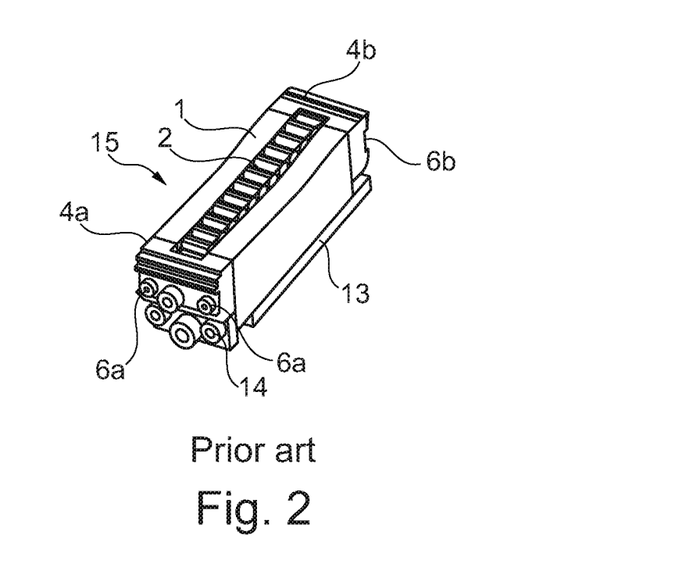

FIGS. 1 and 2 show an exemplary circulating shoe 15 with rollers 2 as roller bodies that are separated from each other with spacers designated with 2a. The rollers 2 run in a support body 1 and transfer compressive forces via its raceway 1a to a not-shown planar rail. Circulating shoes are part of the roller bearing-supported revolving guides and can be displaced endlessly in the axial direction. For this purpose, the rolling bodies formed as rollers 2 are deflected at one end of the circulating shoe 15 by inner deflectors 5a or 5b and by outer deflectors 4a or 4b that are also called head pieces and are returned in the back of the support body 1. The deflectors are mounted with screws 6a and 6b on the support body 1. For the return of the rollers 2, the support body 1 is secured by a cover 3a against the loss of roller bodies. The support body 1 shown here for the circulating shoe 15 is connected by a pretensioning wedge 13 to the not shown surrounding construction. It is adjusted with a pretensioning unit 14 so that the required flow of force between the surrounding construction and the rail is guaranteed.

Figure 3:
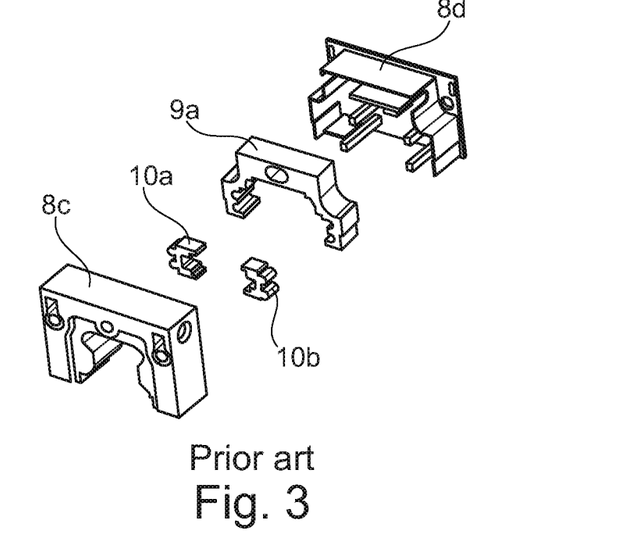

The previously known lubricant storage shown in an exploded view-type representation in FIG. 3 corresponding to the publication DE 10 2009 016 458 A1 is formed of an outer housing half 8c and an inner housing half 8d, a porous molded part 9a for storing lubricant and two lubricant transfer elements 10a and 10b for transferring lubricant to the not shown rail.

Figure 4:
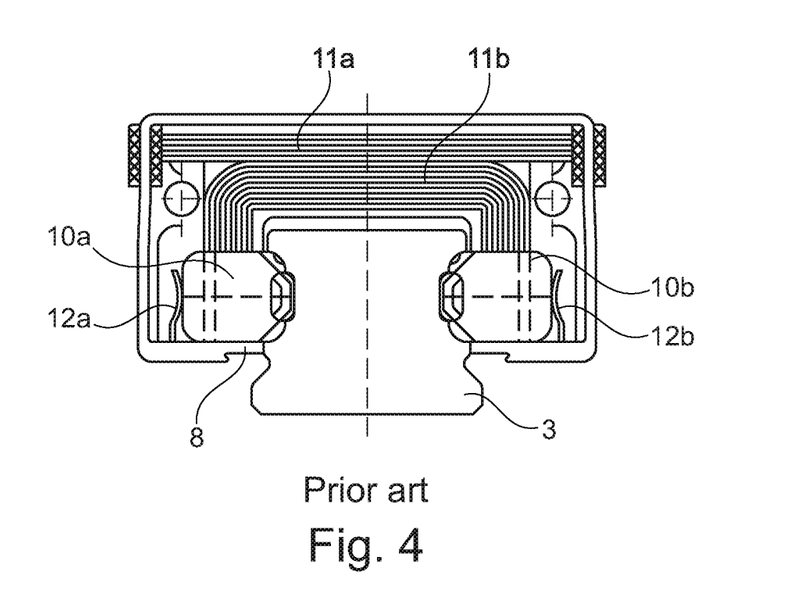

FIG. 4 shows a previously known lubricant storage corresponding to publication DE 198 45 181 A1 in a cross-sectioned state. Visible in the figure are one of the two housing halves 8 and capillary action storage fiber bundles 11a and 11b for storing and guiding lubricant, as well as two lubricant transfer elements 10a and 10b that are pretensioned toward the rail 3 by springs 12a and 12b.

Figure 5:
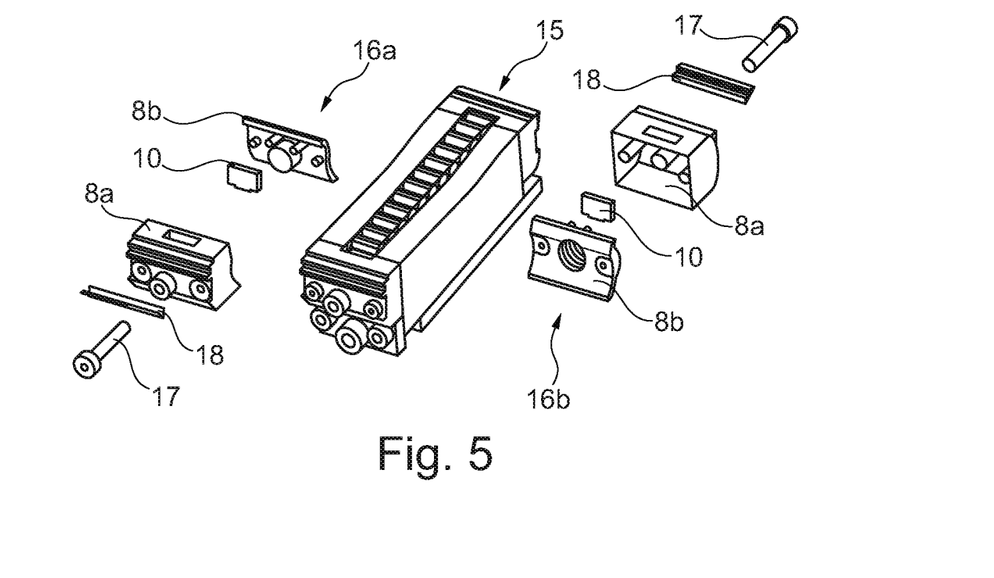
Figure 6:
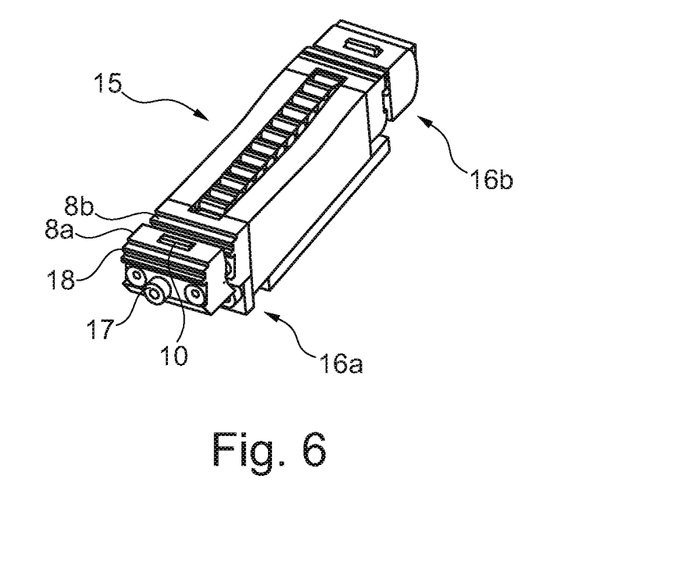

In FIGS. 5 and 6, a circulating shoe 15 is shown on both sides of which there is an attachment element 16a on one end and attachment element 16b on the other end. The attachment elements 16a and 16b have the same construction and are described here only once. Each attachment element is mounted by a central screw 17 on the support body of the circulating shoe 15. Visible in these figures are the two housing shells 8a and 8b. They form the storage volume in which lubricant can be stored in a known way. The lubricant is discharged toward the rail via a lubricant transfer element 10. Furthermore, a front strip 18 can also be seen.

Figure 7:
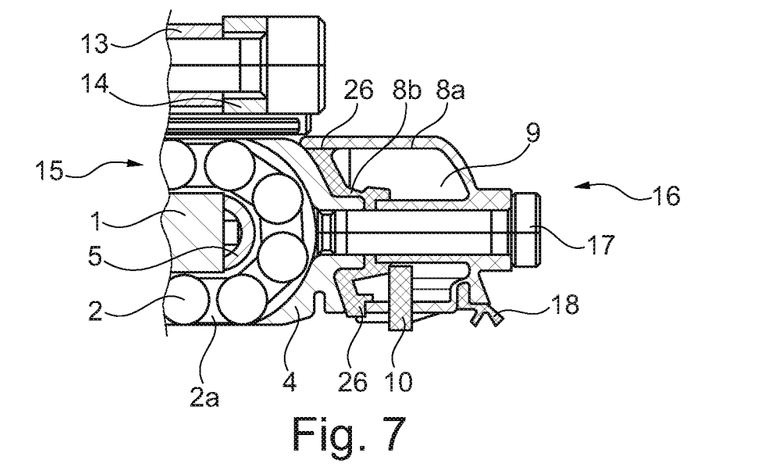

FIG. 7 shows a detailed section through an attachment element 16 that is mounted on a circulating shoe 15 on one end side by a central screw 17. Visible in the figure are the two housing shells 8a and 8b. These form the storage volume 9 in which lubricant can be stored in a known way. The lubricant is discharged toward the rail by a lubricant transfer element 10. Furthermore, the front strip 18 can also be seen as well as the circumferential seal of the two housing shells 8a and 8b, here constructed as labyrinth 26. In this case, the outer housing shell 8a should be made from a solid, rigid material and the inner housing shell 8b should be made from a rubber elastic material. Also visible is the sealing of the passage hole of screw 17 between the two housing shells 8a and 8b and the head piece 4 of the circulating shoe 15, as well as the support body 1 with the inner head piece 5, a spacer 2a, multiple roller bodies formed as rollers 2, and a pretensioning wedge 13 on the pretensioning unit 14.

Figure 8:
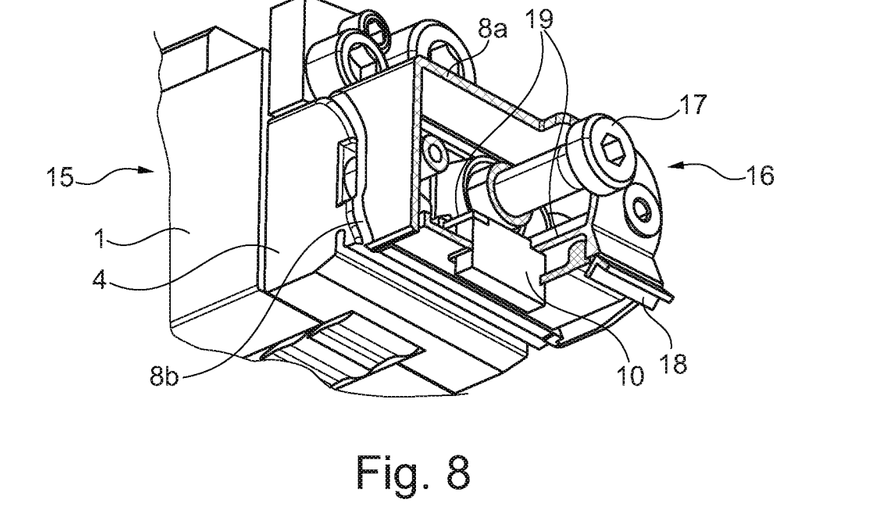

FIG. 8 shows the attachment element 16 that is arranged on one end side of the circulating shoe 15 in a 3D section. Visible are the spring elements 19 that pretension the lubricant transfer element 10 against a not shown rail. The lubricant transfer element 10 is guided by the spring elements 19 and with parts of the housing shells 8a and 8b axially in the pretensioning direction. Also visible are the head piece 4 of the support body 1, the screw 17, and the front strip 18.

Figure 9:
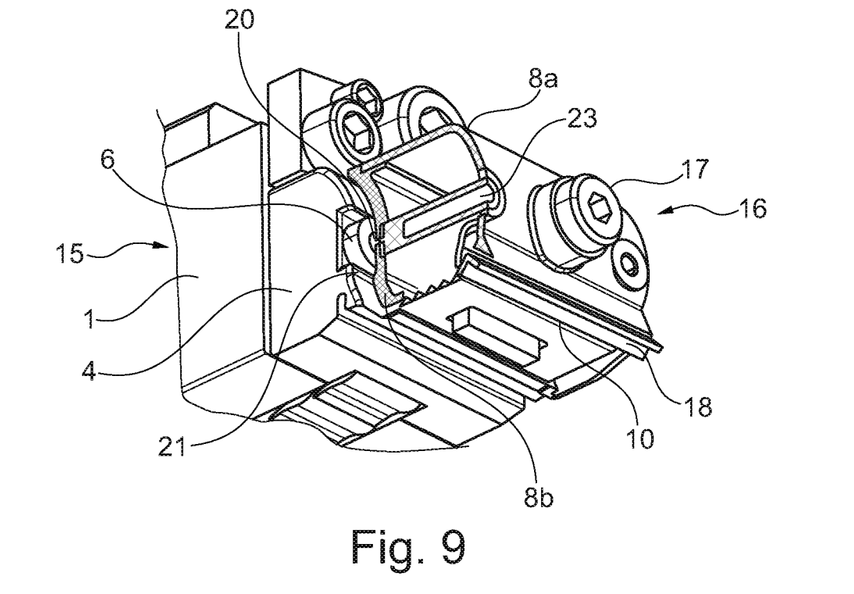
Figure 10:
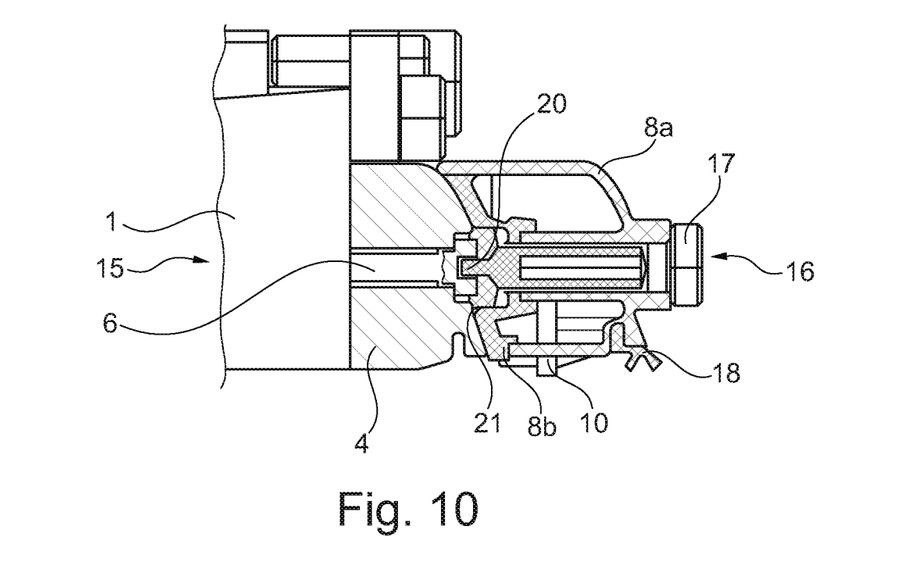

FIGS. 9 and 10 each show an attachment element 16 that is arranged on one end side of the circulating shoe 15 and whose outer housing shell 8a provides at least one peg 20 that is offset radially relative to the axis of the fastening screw 17 of the attachment element 16 and engages in a recess on the circulating shoe 15. This prevents rotation of the attachment element 16 when tightening the screw 17. As an example, in these representations, the INBUS drive of the screw 17 of the head piece 4 of the circulating shoe 15 is used. The centering of the attachment element can also take place by the shaping of this part relative to the head piece 4. Visible in the drawings are a groove 21 in the head piece 4 that is arranged normal to the axis of the screw 17 of the attachment element 16 and provides a centering of the attachment element 16 by a positive-fit insertion of the housing made from the housing shells 8a and 8b.

Figure 11:
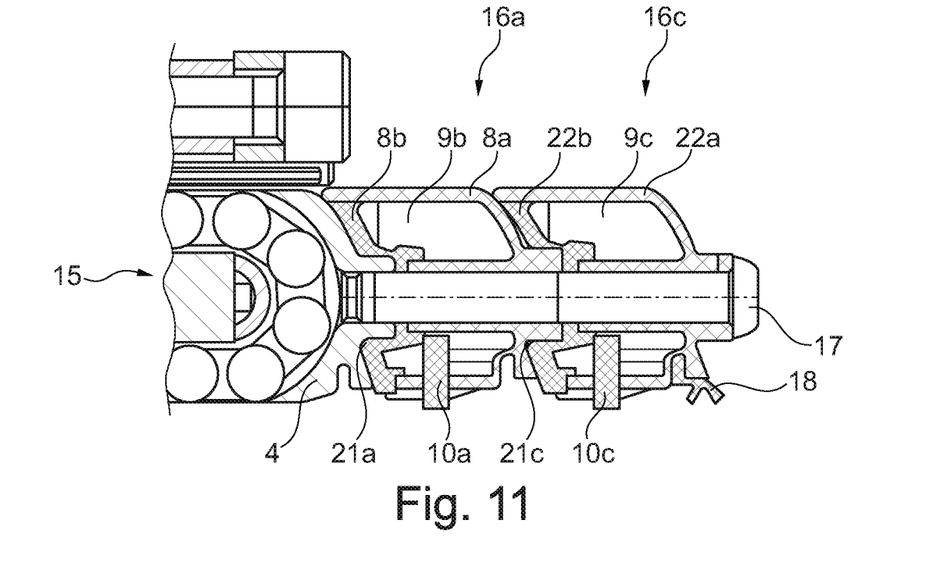

In FIG. 11, the same section as in FIG. 7 can be seen, wherein here two attachment elements 16a and 16b mounted on one side are mounted on the circulating shoe 15 for storing lubricant. In this way, the storage volume 9b and 9c is doubled. The inner structure of the individual elements is identical. The elements are made from the housing shells 8a, 8b, 22a, 22b, and the lubricant transfer elements 10a and 10c, as well as from the fastening screw 17 connecting the two attachment elements 16a and 16b to the head piece 4. Only the strip 18 is arranged on the outer attachment element 16c, so that the lubricant discharged to the not shown rail can move unimpaired to the rolling contact. The positions on the lubricant transfer elements 10a and 10c should be shaped in such an application so that they discharge only half the amount of lubricant onto the rail relative to the individual application. This can be realized by halving the contact surface to the rail. In this way, the service life can be significantly increased without requiring re-lubrication of the entire element.

Figure 12:
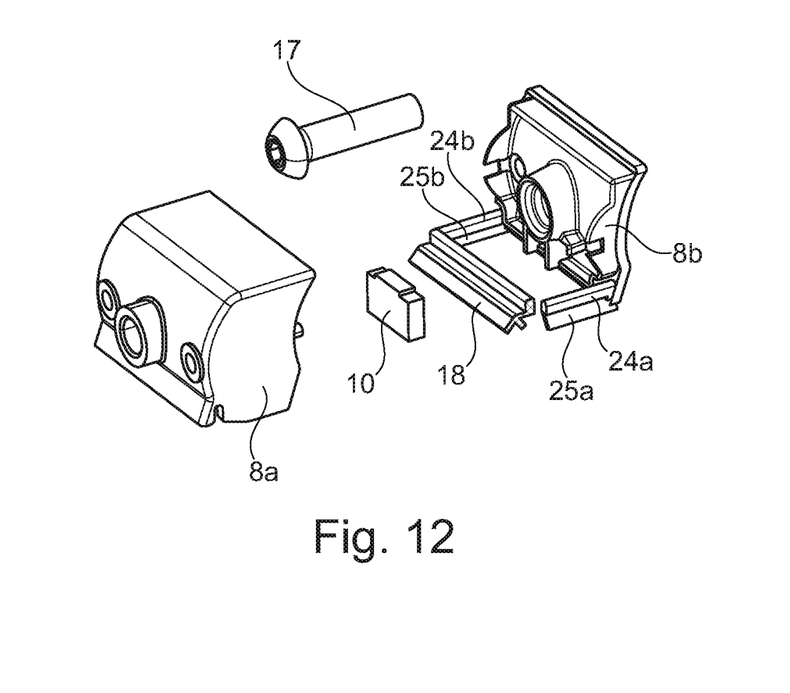

In FIG. 12, the same attachment element as in the section representation in FIG. 7 is to be seen, wherein, in this case, the inner housing shell 8b and the strip 18, which are both made from rubber elastic materials specific to the function, in an integrated, one-piece construction. If these are locally separated from each other in the assembly, they can be connected to each other by connecting pieces 24a and 24b. The connecting pieces 24a and 24b of the inner housing shell 8b must be held accordingly in the outer housing shell 8a. They can also support sealing lips 25a and 25b for lateral sealing for improving the overall sealing.

| List of Reference Symbols | |
|---|---|
| 1 | Support body |
| 1a | Raceway |
| 2 | Roller |
| 2a | Spacer |
| 3 | Rail |
| 3a | Cover |
| 4 | Head piece |
| 4a | Outer deflector |
| 4b | Outer deflector |
| 5 | Inner deflector |
| 5a | Inner deflector |
| 5b | Inner deflector |
| 6 | Fastening screw |
| 6a | Screw |
| 6b | Screw |
| 8 | Housing half |
| 8a | Outer housing shell |
| 8b | Inner housing shell |
| 8c | Outer housing half |
| 8d | Inner housing half |
| 9 | Storage volume |
| 9a | Porous molded part |
| 9b | Storage volume |
| 9c | Storage volume |
| 10 | Lubricant transfer element |
| 10a | Lubricant transfer element |
| 10b | Lubricant transfer element |
| 10c | Lubricant transfer element |
| 11a | Memory fiber bundle |
| 11b | Memory fiber bundle |

-continued

List of Reference Symbols

| | |
|---|---|
| 12a | Spring |
| 12b | Spring |
| 13 | Pretensioning wedge |
| 14 | Pretensioning unit |
| 15 | Circulating shoe |
| 16 | Attachment element |
| 16a | Attachment element |
| 16b | Attachment element |
| 16c | Attachment element |
| 17 | (Fastening) screw |
| 18 | (Front) strip |
| 19 | Spring element |
| 20 | Peg |
| 21 | Groove |
| 21a | Contour profile |
| 21c | Contour profile |
| 22a | Outer housing shell |
| 22b | Inner housing shell |
| 23 | Receptacle hole |
| 24a | Connecting piece |
| 24b | Connecting piece |
| 25a | Sealing lip |
| 25b | Sealing lip |
| 26 | Labyrinth |

The invention claimed is:

1. A linear roller bearing, comprising:
a roller body circulating shoe that includes a support body with a head piece at each end,
a first attachment element arranged on one of the ends as a lubricating device,
said first attachment element includes a cavity defining a volume for lubricant storage and lubricant transfer to a rail guiding the circulating shoe,
the first attachment element is centered and rotationally locked on one of the head pieces via: (i) a portion of one of the head pieces defines an arcuate surface that abuts a complementary arcuate surface formed on the first attachment element, and (ii) insertion of the portion of one of the head pieces inside of the first attachment element,
the first attachment element comprises an inner housing shell that contacts the head piece of the support body of the circulating shoe and an outer housing shell facing away from the support body, said inner and outer housing shells are mounted by a central screw on the head piece, and
the central screw is guided through passage holes that are aligned with each other in the outer housing shell and the inner housing shell.

2. The linear roller bearing according to claim 1, wherein the first attachment element is mountable on the circulating shoe.

3. The linear roller bearing according to claim 1, wherein the first attachment element further comprises a lubricant transfer element that is pretensioned against the rail, compensating for wear.

4. The linear roller bearing according to claim 3, wherein the first attachment element is centered and mounted rotationally locked on the head piece via a shape coupling.

5. The linear roller bearing according to claim 1, wherein the cavity defining the volume is formed by at least the inner and outer housing shells that are mutually sealed by a pretensioning force of at least the central screw.

6. The linear roller bearing according to claim 1, wherein at least one of the inner or outer housing shells forming the housing holds a strip as a separate part that is adapted to form a seal against a running surface.

7. The linear roller bearing according to claim 1, wherein at least one of the inner or outer housing shells holds a strip that is adapted to form a seal against a running surface.

8. The linear rolling bearing of claim 1, further comprising a second attachment element arranged on an opposite one of the ends of the support body from the first attachment element as a second lubricating device.

9. The linear rolling bearing of claim 8, wherein the second attachment element has an identical construction as the first attachment element.

10. The linear rolling bearing of claim 1, further comprising rolling elements supported on the support body.

11. An attachment element for a linear roller bearing including a roller body circulating shoe with a support body with a head piece at each end used for lubricating a running rail, the attachment element comprising:
a housing formed by:
an inner housing shell that is adapted dimensioned to contact the head piece such that the housing is centered and rotationally locked on the head piece via: (i) a portion of one of the head pieces defines an arcuate surface that abuts a complementary arcuate surface formed on the first attachment element, and (ii) insertion of the portion of the head piece inside of the first attachment element, and
an outer housing shell that is dimensioned to face away from the support body, said inner and outer housing shells are dimensioned to be mounted by a central screw on the head piece,
a cavity located in the housing that defines a volume for lubricant storage and lubricant transfer to a rail guiding the circulating shoe,
the central screw is guided through passage holes that are aligned with each other in the outer housing shell and the inner housing shell, and
a lubricant transfer element in communication with the cavity and dimensioned to contact the running rail.

12. The attachment element of claim 11, wherein the lubricant transfer element is pretensioned against the rail to compensate for wear.

13. The attachment element of claim 11, wherein the attachment element is adapted to be centered and mounted rotationally locked on the head piece via a shape coupling.

14. The attachment element of claim 11, wherein the cavity defining the volume for lubricant storage and lubricant transfer is formed by the inner and outer housing shells that are mutually sealed by a pretensioning force of at least the central screw.

15. The attachment element of claim 11, wherein at least one of the inner or outer housing shells forming the housing holds a strip as a separate part that is adapted to form a seal against a running surface.

16. The attachment element of claim 11, wherein at least one of the inner or outer housing shells holds a strip that is adapted to form a seal against a running surface.

* * * * *

UNITED STATES PATENT AND TRADEMARK OFFICE
CERTIFICATE OF CORRECTION

PATENT NO. : 10,520,031 B2
APPLICATION NO. : 15/767864
DATED : December 31, 2019
INVENTOR(S) : Patrick Daniel and Ralf Stalter

Page 1 of 1

It is certified that error appears in the above-identified patent and that said Letters Patent is hereby corrected as shown below:

In the Claims

In Claim 11, at Column 6, Line 24, after the word "is", delete "adapted".

Signed and Sealed this
Thirty-first Day of March, 2020

Andrei Iancu
*Director of the United States Patent and Trademark Office*